United States Patent [19]

Imaizumi

[11] Patent Number: 4,677,371

[45] Date of Patent: Jun. 30, 1987

[54] SENSOR FOR DETECTING THE PRESENCE AND LOCATION OF A WATER LEAK

[75] Inventor: Haruo Imaizumi, Ohmiya, Japan

[73] Assignee: Junkosha Co., Ltd., Tokyo, Japan

[21] Appl. No.: 773,210

[22] Filed: Sep. 6, 1985

[30] Foreign Application Priority Data

Oct. 9, 1984 [JP] Japan .................................. 59-211925

[51] Int. Cl.$^4$ ............................................ G01R 31/08
[52] U.S. Cl. ...................................... 324/52; 340/605; 174/11 R
[58] Field of Search ............................... 324/52, 54, 51; 174/11 R, 115; 73/40.5 R, 40, 49.1; 340/605, 604; 200/61.04, 61.05

[56] References Cited

U.S. PATENT DOCUMENTS

| | | | |
|---|---|---|---|
| 3,365,661 | 1/1968 | Zimmerman | 324/52 |
| 4,029,889 | 6/1977 | Mizuochi | 174/11 R |
| 4,319,232 | 3/1982 | Westphal et al. | 340/605 X |
| 4,594,638 | 6/1986 | Suzuki et al. | 174/11 R X |

FOREIGN PATENT DOCUMENTS 58-96248  6/1983  Japan .

*Primary Examiner*—Reinhard J. Eisenzopf
*Assistant Examiner*—Jack B. Harvey
*Attorney, Agent, or Firm*—Mortenson & Uebler

[57] ABSTRACT

A coaxial cable and a bare wire are aligned in parallel relationship and affixed within insulation covers which have openings therein so as to partly expose both the bare wire and the outer conductor of the coaxial cable at the atmosphere, forming a leak detecting sensor. By the use of resistance meters, the core wire of the coaxial cable is utilized to detect both the presence and the location of a leak.

4 Claims, 2 Drawing Figures

SENSOR FOR DETECTING THE PRESENCE AND LOCATION OF A WATER LEAK

BACKGROUND OF THE INVENTION

The present invention relates to a detecting sensor for detecting the leakage of an electrically conductive liquid such as water. The demand for a detecting sensor of this kind is important for the preservation of public security as the result of recent development of computers.

As a sensor for detecting leaking liquids such as a conductive liquid, a "conductive liquid detecting sensor" is known, as is described in Japanese Utility Model Laid-Open No. 58-96248, for example.

The leaking liquid detecting sensor of the kind known in the prior art detects a leaking liquid by detecting a drop in a resistance when a pair of bare conductors are bridged by a conductive liquid, basically by baring the paired conductors which are held in insulators partially open to the atmosphere. As a result, the prior art sensor of this kind can detect the fact that leakage has occurred but cannot locate the same. Location has to resort to the so-called "Murray's loop method", by which the location is made by metering the resistances at both ends of that sensor. This method additionally needs two electric wires which lead from one end of the sensor to the other.

In view of the foregoing description, an object of the present invention is to provide a leaking liquid detecting sensor which need not connect other electric wires for locating the position of the leaking liquid.

SUMMARY OF THE INVENTION

A leak detecting sensor for detecting leaks of an electrically conductive liquid is provided comprising a coaxial cable having a central conductor and an external conductor separated by an electrically insulating material, and a bare conductor juxtaposed in substantially parallel relation to the coaxial cable, the coaxial cable and bare conductor held between insulating coverings at a desired spacing, the insulating coverings having openings therein adjacent the coaxial cable and the bare conductor. The external conductor of the coaxial cable is preferably of a braided construction comprising conductor wires braided together with hydrophilic yarn filaments. The insulating coverings are preferably made of a hydrophobic resin material such as a fluoroplastic resin.

DETAILED DESCRIPTION OF THE INVENTION AND PREFERRED EMBODIMENTS WITH REFERENCE TO THE DRAWINGS

A coaxial cable and a bare wire are aligned in parallel relationship and affixed within insulation covers which have openings therein so as to partly expose both the bare wire and the outer conductor of the coaxial cable to the atmosphere, forming a leak detecting sensor. By means of resistance meters, the core wire of the coaxial cable is utilized to detect both the presence and the location of a leak.

According to the present invention, the detecting sensor comprises a coaxial cable having a central conductor and an external conductor spaced apart by an insulating material, a bare conductor juxtaposed in parallel relation to said coaxial cable, and an insulating covering holding the coaxial cable and bare conductor at a desired spacing and having openings therein adjacent the coaxial cable and the bare conductor.

In this construction, the detecting response is advantageously improved if the external conductor of the coaxial cable is made of a braided assembly of wires woven with hydrophilic yarn filaments. If the faces of the insulator adjacent the openings of the two conductors are made of a water-repulsive material such as the hydrophobic fluoroplastics, on the other hand, it lessens the errors which might otherwise be caused by the splash of a small amount of water during cleaning operations.

According to the present invention, the leaking liquid detecting cable is composed of the coaxial cable having the central conductor and the external conductor spaced apart by the insulating material and an insulating covering holding both the coaxial cable and the bare conductor, which is juxtaposed in parallel relationship to the former, at a desired spacing, the insulation having openings therein adjacent both the coaxial cable and the bare wire. As a result, if both the portions of the external conductor of the coaxial cable and the bare conductor exposed to the atmosphere are bridged by the leaking liquid, this bridging is detected in terms of a drop in the resistance of the wires so that the presence of the leaking liquid is detected. The location of the leaking liquid can be determined from the ratio of the following two metered values: (1) the resistance between the external conductor of the coaxial cable and the bare conductor at one end of the sensor when the liquid leakage occurs, and (2) the resistance between the central conductor of the coaxial cable and the bare conductor at the end of the sensor.

Figure 1:
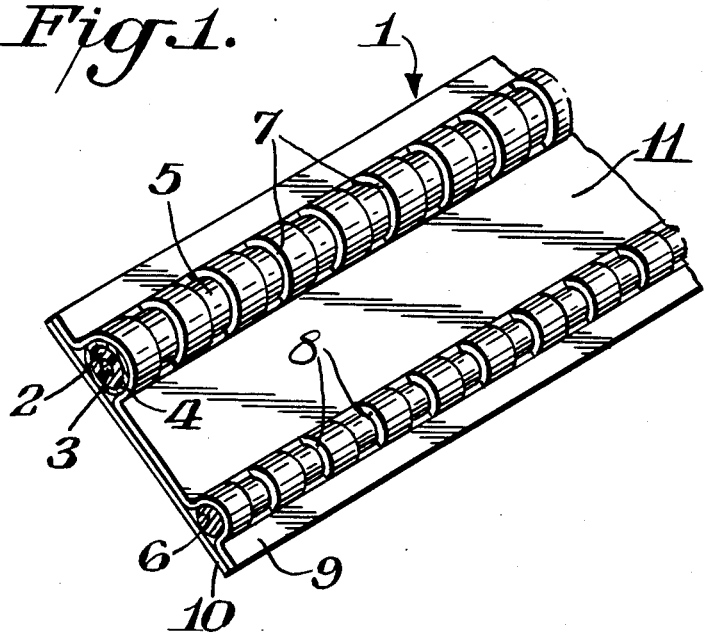
FIG. 1 is a perspective view showing the end portion of a leaking liquid detecting sensor according to one embodiment of the present invention.

A detailed description of the invention and preferred embodiments is best provided by reference to the drawings wherein FIG. 1 is a perspective view showing the end portion of a leaking liquid detecting sensor according to one embodiment of the present invention. In this leaking liquid detecting sensor 1, a coaxial cable 5, which has a central conductor 3 and an external conductor 4 spaced apart by an insulating material 2, is arranged in parallel relationship with a bare conductor 6. The coaxial cable 5 and bare conductor 6 are preferably covered on one side by fluoroplastic film 9, which has a number of rectangular openings 7 for exposing the coaxial cable and somewhat smaller rectangular openings 8 for exposing the bare conductor 6, and has another fluoroplastic film 10 having no openings such that the external conductor 4 of the coaxial cable 5 and the bare conductor 6 are partially exposed through the aforementioned respective openings 7 and 8.

In the leaking liquid detecting sensor 1 having construction thus far described, the external conductor 4 of the coaxial cable 5 is a braided construction of conductor wires woven together with hydrophilic yarns. Leaking water, if any, is promptly absorbed by the hydrophilic yarns so that the response of the bridging conduction by the leaking water is improved together with the response to the leaking water detection.

An insulating laminate 11 composed of the one fluoroplastic film 9 and another fluoroplastic film 10 is preferably made of a highly water-repulsive resin such as polytetrafluoroethylene but may be made of other fluoroplastics. According to the present invention, the material for the insulator is not limited to the fluoroplastics, but may be another material such as a water-repulsive material such as polyester.

The leaking liquid detecting system using the leaking liquid detecting cable 1 according to the present invention will now be described by way of one example.

Figure 2:
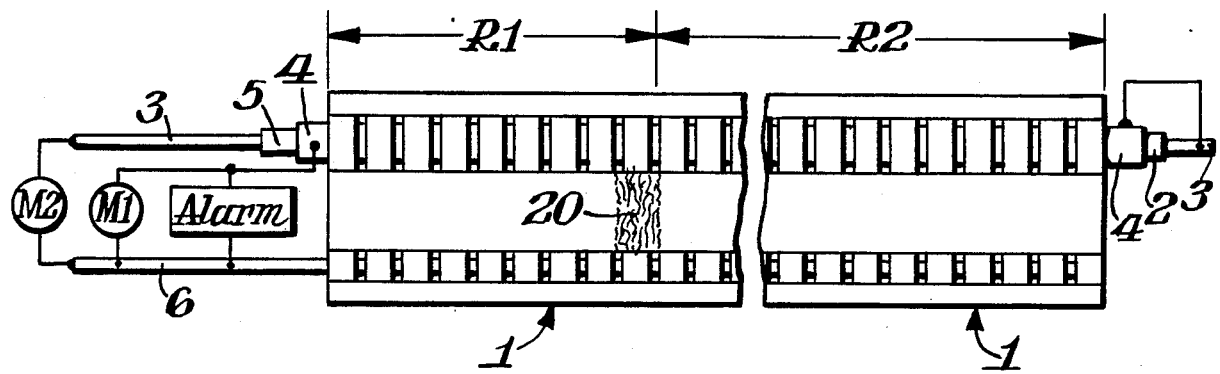
FIG. 2 is a view showing a concept of the entire detecting system using the leaking liquid detecting sensor according to the present invention.

If a liquid leakage 20 occurs in a portion of the leaking liquid detecting sensor 1 and bridges the external conductor 4 of the coaxial cable 5 and the bare conductor 6, as shown in FIG. 2, an alarm is operated in response to changes in the resistance or impedance value between the external conductor 4 and the bare conductor 6 and thus detects the water leakage. The location of the liquid leakage can be determined on the basis of that information, the resistance $r_1$ between the external conductor 4 and the bare conductor 6 and the resistance $r_2$ between the central conductor 3, connected electrically at the other end with the external conductor 4, and the bare conductor 6, measured by means of resistance meters M1 and M2. These metered values indicate the conductor resistance from one end of the bare conductor 6 and the liquid leakage point but are negligibly small. As a result, the ratio of those metered values $r_1$ and $r_2$ becomes substantially equal to the ratio between the resistance R1 from one end of the external conductor 4 of the coaxial cable 5 to the liquid leakage point and the resistance R2 from the liquid leakage point to the other end of the same.

Those values make it possible to calculate the location of the liquid leaking point of the leaking liquid detecting sensor 1 having a predetermined length.

As has been described hereinbefore, according to the present invention, the leaking liquid detecting sensor is constructed to comprise a coaxial cable having a central conductor and an external conductor spaced apart by an insulating material, a bare conductor juxtaposed in a parallel relation to the coaxial cable, and an insulator holding the coaxial cable and bare conductor at a desired spacing and having openings therein. As a result, the leakage of a conductive liquid can be reliably detected between the bare conductor and the external conductor of the coaxial cable and easily located by the aforesaid resistance metering method without providing any other electric wires. In addition, this leaking liquid detecting sensor can be used as a section sensor so that the liquid leakage in the section can be transmitted through the coaxial cable and can be detected. An outstanding industrial improvement is attained by the remarkably useful cable-shaped leaking liquid sensor of the invention.

The present invention is not limited to the foregoing embodiment, but similar effects can be attained by making modifications within the scope of the concept of the present invention such as by forming the openings which are formed in the insulator so as to partially expose the conductors, into an arbitrary shape such as a circle or triangle.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A leak detecting sensor for detecting leaks of water comprising a coaxial cable having a central conductor and an external conductor separated by an electrically insulating material, and a bare conductor juxtaposed in substantially parallel relation to said coaxial cable, said coaxial cable and bare conductor held between insulating coverings at a desired spacing, said insulating coverings having openings therein adjacent the coaxial cable and the bare conductor.

2. The sensor of claim 1 wherein said external conductor of said coaxial cable is of a braided construction comprising conductor wires braided together with hydrophilic yarn filaments.

3. The sensor of claim 1 wherein said insulating coverings are made of a hydrophobic resin material.

4. The sensor of claim 3 wherein said hydrophobic resin material is a fluoroplastic resin.

* * * * *